(12) United States Patent
Day

(10) Patent No.: US 9,990,595 B2
(45) Date of Patent: Jun. 5, 2018

(54) MODELED SERVICE ENDPOINTS IN BUSINESS PROCESS MODEL AND NOTATION TOOLS

(75) Inventor: Rouven Day, Waghäusel (DE)

(73) Assignee: SAP SE, Wolldorf (DE)

( * ) Notice: Subject to any disclaimer, the term of this patent is extended or adjusted under 35 U.S.C. 154(b) by 1636 days.

(21) Appl. No.: 12/558,441

(22) Filed: Sep. 11, 2009

(65) Prior Publication Data
US 2011/0066565 A1 Mar. 17, 2011

(51) Int. Cl.
G06Q 50/00 (2012.01)
G06Q 10/06 (2012.01)

(52) U.S. Cl.
CPC ........... *G06Q 10/06* (2013.01); *G06Q 10/067* (2013.01)

(58) Field of Classification Search
USPC ................ 705/1.1, 80, 300–348, 901–912
See application file for complete search history.

(56) References Cited

U.S. PATENT DOCUMENTS

| 5,692,183 | A | * | 11/1997 | Hapner et al. | |
| 6,266,709 | B1 | * | 7/2001 | Gish | 719/315 |
| 7,152,228 | B2 | * | 12/2006 | Goodwin et al. | 717/146 |
| 7,305,482 | B2 | * | 12/2007 | Bodin et al. | 709/231 |
| 2005/0209993 | A1 | * | 9/2005 | Koehler | 707/1 |
| 2006/0293941 | A1 | * | 12/2006 | Ivanov et al. | 705/8 |
| 2007/0006134 | A1 | * | 1/2007 | Larvet et al. | 717/104 |
| 2008/0300838 | A1 | * | 12/2008 | Drumm et al. | 703/6 |
| 2009/0037237 | A1 | * | 2/2009 | Weber et al. | 705/7 |

OTHER PUBLICATIONS

IBM.com, "IBM Globalization—Terminology", Jan. 31, 2012, www.ibm.com, www.ibm.com/software/globalization/terminology.*
Google, "bpmn2bpel: a tool for translating BPMN models into BPEL processes", Jan. 25, 2009, http://web.archive.org/web/20090125133815/http://code.google.com/p/bpmm2bpel.*
Mark Nelson, "Choosing BPMN or BPEL to model your processes", Feb. 13, 2012, http://redstack.wordpress.com/2012/02/12/choosing-bpmn-or-bpel-to-model-your-processes.*
Chun Ouyang et al., "Translating BPMN to BPEL", available 2006, bpmcenter.org/wp-content/uploads/reports/2006/BPM-06-02.pdf.*
Stephen A. White, "Using BPMN to Model a BPEL Process", Mar. 2005, http://www.bptrends.com/publicationfiles/03-05%20WP%20Mapping%20BPMN%20to%20BPEL-%20White.pdf.*

* cited by examiner

*Primary Examiner* — Paul R Fisher
(74) *Attorney, Agent, or Firm* — Mintz Levin Cohn Ferris Glovsky and Popeo, P.C.

(57) ABSTRACT

A system and method for modeling service endpoints of BPMN processes is disclosed. The process is modeled using a BPMN modeling tool. A service endpoint is modeled using the BPMN modeling tool. A uniform resource locator (URL) is generated for the service endpoint, the URL being a web-based address under which a service represented by the process can be called by a business process application. The service endpoint is linked to the process, and then service-provisioned to be executed in the BPMN domain.

20 Claims, 5 Drawing Sheets

MODELED SERVICE ENDPOINTS IN BUSINESS PROCESS MODEL AND NOTATION TOOLS

BACKGROUND

This disclosure relates generally to business process modeling, and more particularly to modeled service endpoints in business process model and notation (BPMN) tools.

Business Process Management (BPM) tools allow users to model, execute, and monitor your business processes based on a common process model. The Business Process Model and Notation (BPMN) is an industry standard graphic notation for representing business process workflows. BPMN shows the end-to-end flow of a business process in a flowchart-type style, and is often used with a user-interface-oriented BPMN tool. One example of a BPMN tool is SAP's NetWeaver BPM component (NW BPM, also referred to as "Galaxy"), which is designed to help users improve the efficiency of business processes, reduce errors in complex repetitive tasks, and lower exception-handling costs. With SAP BPMN, users can compose process steps, define business rules and exceptions, model process flows using BPMN, execute process models efficiently, and support interaction with running processes via personalized user interfaces or interactive forms. Users can also monitor business processes to improve process quality and efficiency.

Tools such as NW BPM provide a process composer that enables process architects and developers to create and debug executable business process models. Each business process model clearly defines the rules and exceptions governing the process steps that are performed by people or systems in response to specific business events. BPMN processes in NW BPM can be exposed as services, e.g. as web services. This means that once the BPMN process has been deployed, it can be initiated via a web service call. Providing a BPMN process as a service is referred to as "service provisioning." In service provisioning use cases, the consumer can initiate an exposed BPMN process by sending a message to the corresponding endpoint. Service endpoints are well-known in the web service domain like the Web Service Description Language (WSDL), and define a URL under which the service can be called.

However, exposing a BPMN process as a service also requires an endpoint. What is needed is an ability to model such an endpoint in a BPMN tool, ideally by means of BPMN constructs, without having to leave the BPMN domain, and without having to have the expertise of the service domain or to move to a different tool, like a service modeling tool, to service-enable the BPMN process.

SUMMARY

In general, this document discusses a system and method for modeling service endpoints in BPMN tools using BPMN constructs. A separate endpoint entity for BPMN processes exposed as a service is advantageous in that a user can define a meaningful name for the endpoint, which is part of the URL, and the user can control the lifecycle of the endpoint by hand using a BPMN tool of a process composer to ensure that the endpoint interface stays consistent. Further, the user can reuse the endpoint for different catching events, if desired.

In accordance with one aspect, a computer-implemented for modeling service endpoints of a BPMN process is disclosed. The method can be performed by execution of computer readable program code by at least one processor of at least one computer system. The method includes modeling the process using at least one of the processors running a BPMN modeling tool, and modeling a service endpoint using the BPMN modeling tool. The method further includes generating, using at least one of the processors, a uniform resource locator (URL) for the service endpoint, the URL being a web-based address under which a service represented by the process can be called by a business process application. The method further includes linking, using at least one of the processors, the service endpoint to the process.

In accordance with another aspect, a system for modeling service endpoints of a BPMN process is presented. The system includes a storage device having an enterprise services repository. The system further includes a process composer computer including a BPMN modeling tool in communication with the storage device. The process composer is a BPMN modeling tool on a client computer that allows to model processes and service endpoints for the processes and deploy and execute them on the process server. The process composer can further be configured to deploy the service endpoint to the process server, generate a uniform resource locator (URL) for the service endpoint, the URL being a web-based address under which a service represented by the process can be called by a business process application, and link the service endpoint to the process.

In accordance with yet another aspect, a computer program product for modeling service endpoints of a BPMN process is presented. The product comprises a storage medium readable by at least one processor and storing instructions for execution by the at least one processor for executing a method. The method includes modeling the process in a BPMN domain, modeling a service endpoint of the process in the BPMN domain, and defining a uniform resource locator (URL) for the service endpoints. The URL is a web-based address under which a service represented by the process can be called by a business process application. The method further includes linking the set of service endpoints to the process via the URL, and service-enabling the process and the set of service endpoints.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a system and method for modeled service endpoints in BPMN tools. The system and method are implemented using an object oriented programming language code, such as Java, that runs inside of a software development platform, such as Eclipse. A development platform such as Eclipse provides extension mechanisms via plug-ins. The corresponding plug-ins are loaded by the Eclipse framework whenever the functionality of a plug-in is needed.

In one exemplary implementation, the code for Modeled Service Endpoints in a NW BPMN tool is stored, with other functionality, in the BPMN tool plug-in. This code highly interacts with a modeling infrastructure (MOIN) of SAP for Eclipse-based tools. MOIN allows model driven development, meaning that the entities (e.g. BPMN artifacts) that are modeled by a user are stored in the form of models inside MOIN based on given metamodels.

Figure 1:
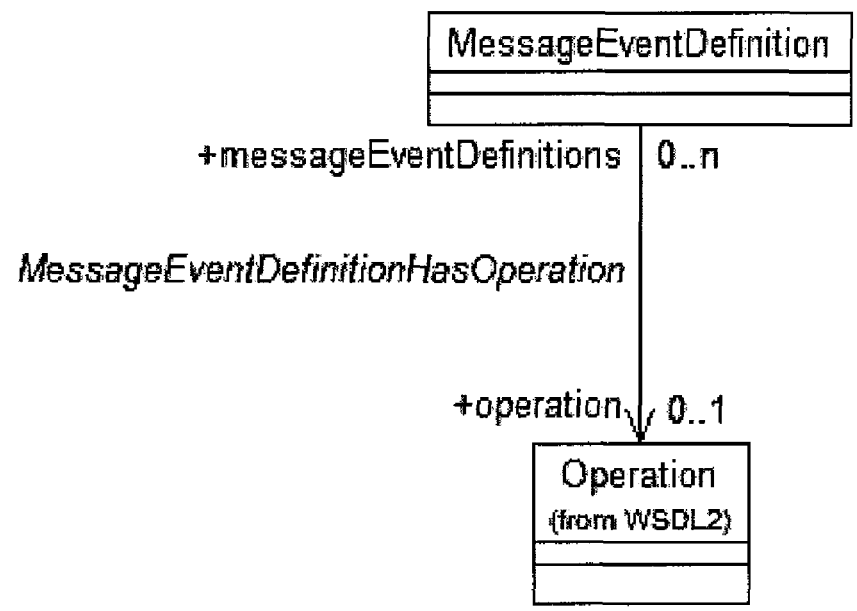
FIG. 1 illustrates a model for a message event definition and operation.

In accordance with some implementations, to create a new modeled service endpoint, a wizard is opened, and an instance of a Message Event Definition (part of a BPMN metamodel) is created in the MOIN model and stored as a transient model entity in memory. The wizard can be written in the ECLIPSE Standard Widget Toolkit (SWT), for example. The instance of the Message Event Definition reflects the model entity for the Modeled Service Endpoint in the BPMN tool. In the wizard the user enters a name and selects a service operation before they can click "finish" to persist the model. The name is taken as part of the service endpoint name that can be constructed out of the following pattern:
http://<hostname>:<port>/bpm/<vendor>/<dcname>/<eventdefinitionname>?wsdl This URL is used as an identifier for the service endpoint the user modeled with the means of BPMN. The selected Operation is bound to the Message Event Definition in the model, as illustrated in FIG. 1. The Operation then describes the interface of that endpoint. The user can then bind the Modeled Service Endpoint to an implementation, which is a Process instance in some implementations.

Figure 2:
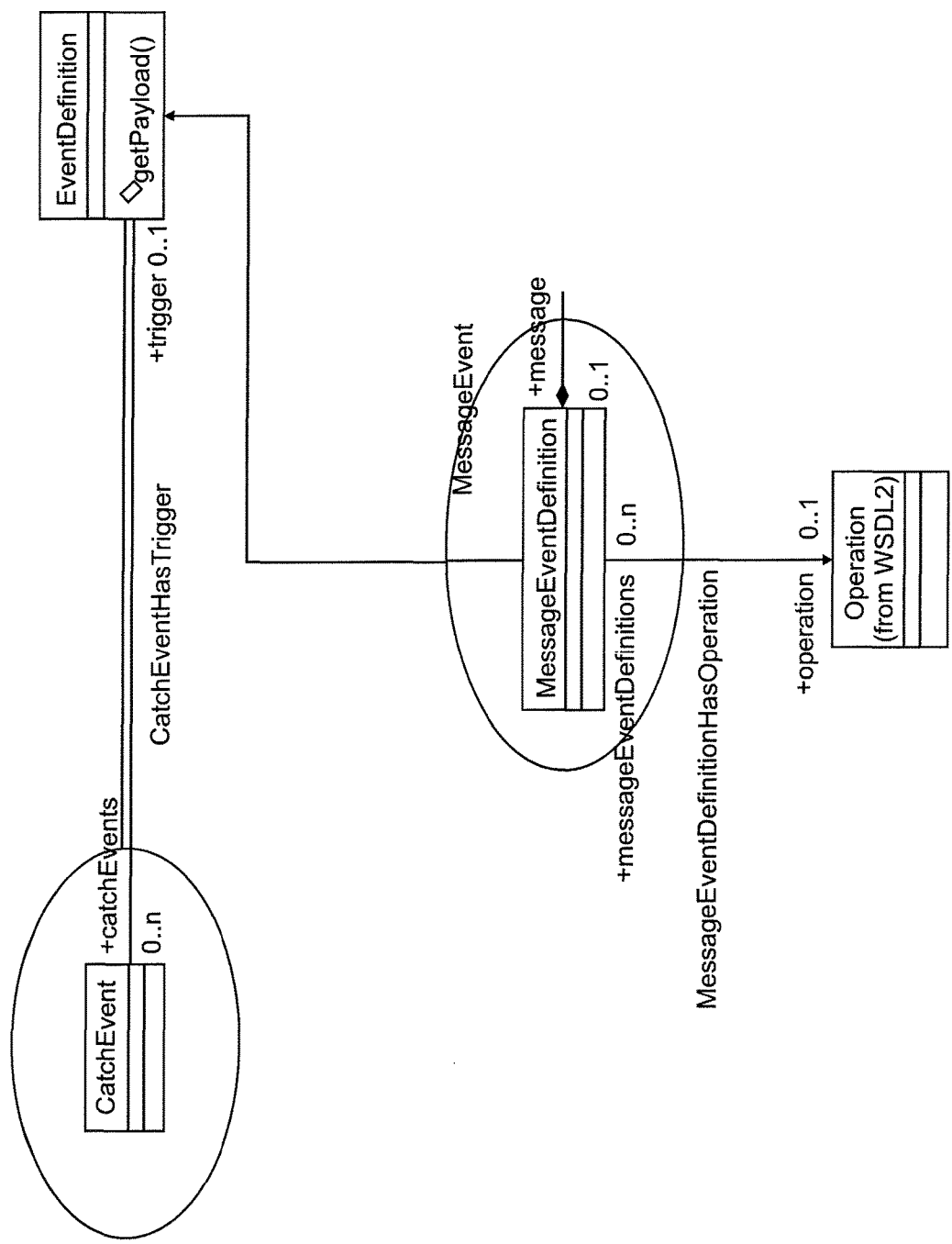
FIG. 2 illustrates another model of the message event definition and its relation to catch events and operation.

This information is stored in the model with the means of BPMN as follows: The user selects the corresponding Modeled Service Endpoint as the trigger of the Message Start Event of the Process that should be bound. By attaching a Message Event Definition to a Start Event of a Process the binding between the interface (=Operation instance) and the process (=Process instance) via the modeled service endpoint (=Message Event Definition instance) is reflected in the model, as shown in FIG. 2. The Message Event Definition is a binder, and describes what a Web Service Definition Language (WSDL) document describes in its binding section: i.e. a concrete service that is reachable under a specific endpoint, and which can be bound to an operation of a service interface.

Figure 3:
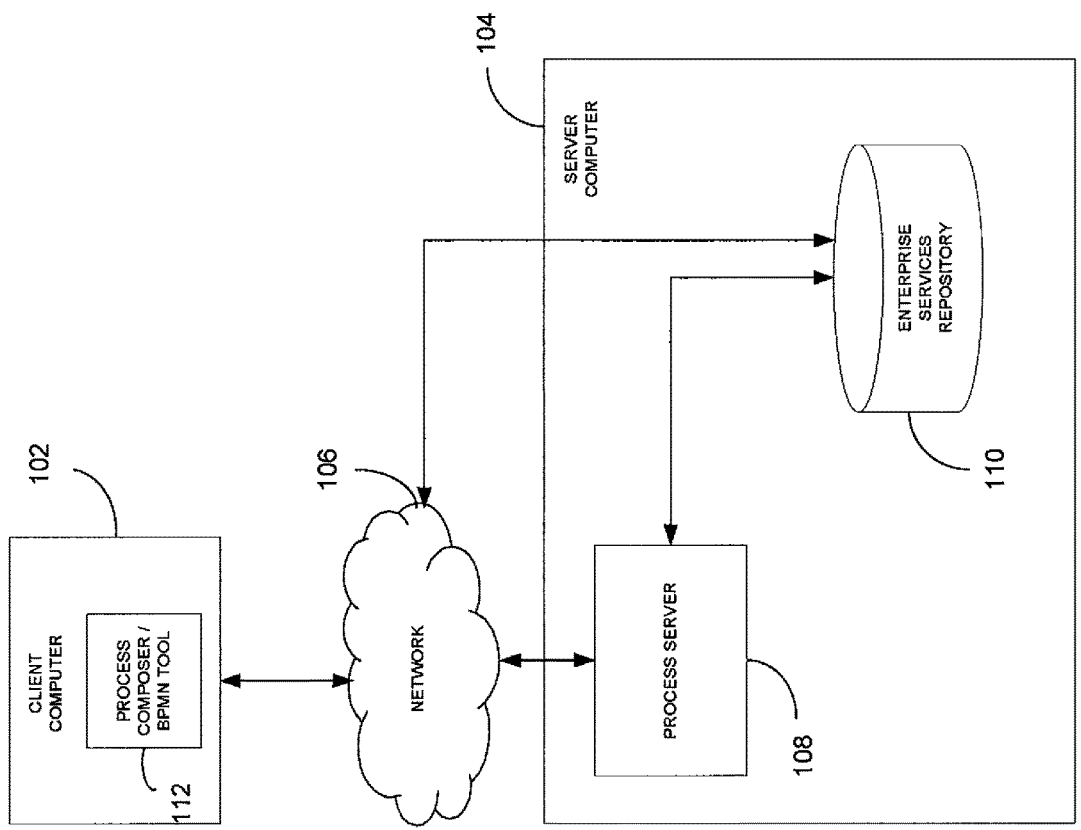
FIG. 3 is a block diagram of a system that executes method for providing a BPMN process as a service by using modeled endpoints.

FIG. 3 is a block diagram of a system 100 that a method for providing a BPMN process as a service by using modeled endpoints. The system 100 includes a client computer 102 and a server computer 104, such as a single server computer or group of server computers. The server computer 104 communicates web applications and services to the client computer 102 via communications network 106, such as the Internet. Communications network 106 can include any number of wired and/or wireless networks.

The server computer 104 provides enterprise services that are stored in an enterprise services repository 110. At designtime the process composer 112 can retrieve the enterprise service description from the enterprise services repository 110 based on requests from one or more client computers 102, and which are in turn based on BPMN processes modeled in a BPMN tool 112. The BPMN tool enables users to model business processes with the graphic notation and flowcharting techniques of BPMN, and to model service endpoints as described herein. At runtime a process server 108 can call the enterprise services within a BPM application.

Figure 4:
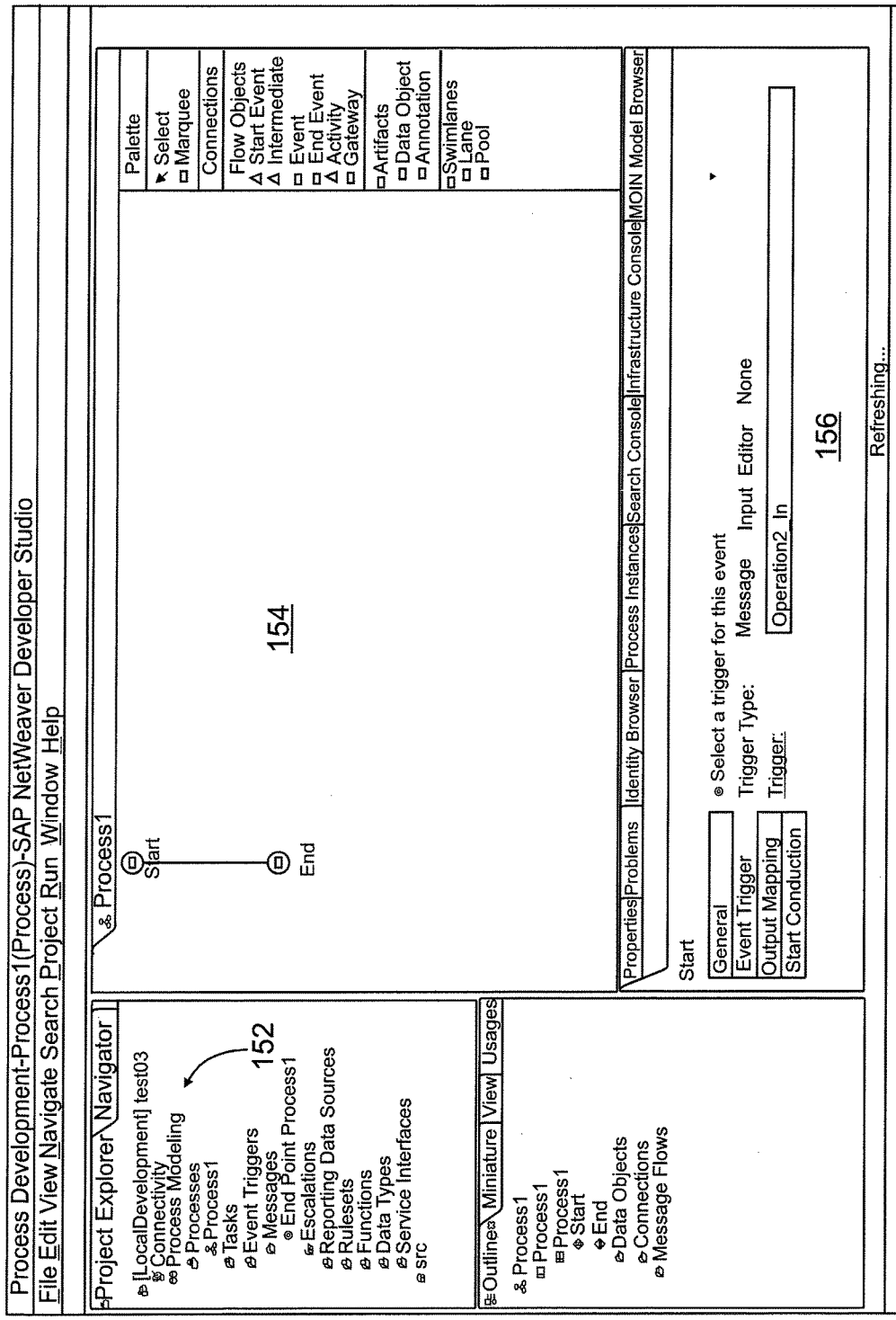
FIG. 4 shows a user interface of a BPMN tool and process composer.

FIG. 4 shows an exemplary user interface 150 of a BPMN tool provided by a process composer application and computer program product. In addition to a set of function controls and menus, the user interface includes a folder tree 152 with a number of folders to indicate modeled processes and message triggers that can be used to trigger a process. The processes can be defined and modeled and generated in a graphical modeling window 154 of the user interface 150, using the graphic notation and flowcharting techniques of BPMN. The user interface 150 can also include a properties definition area 156 in which users can define properties of processes, as well as event triggers on message events, as will be explained in further detail below.

Figure 5:
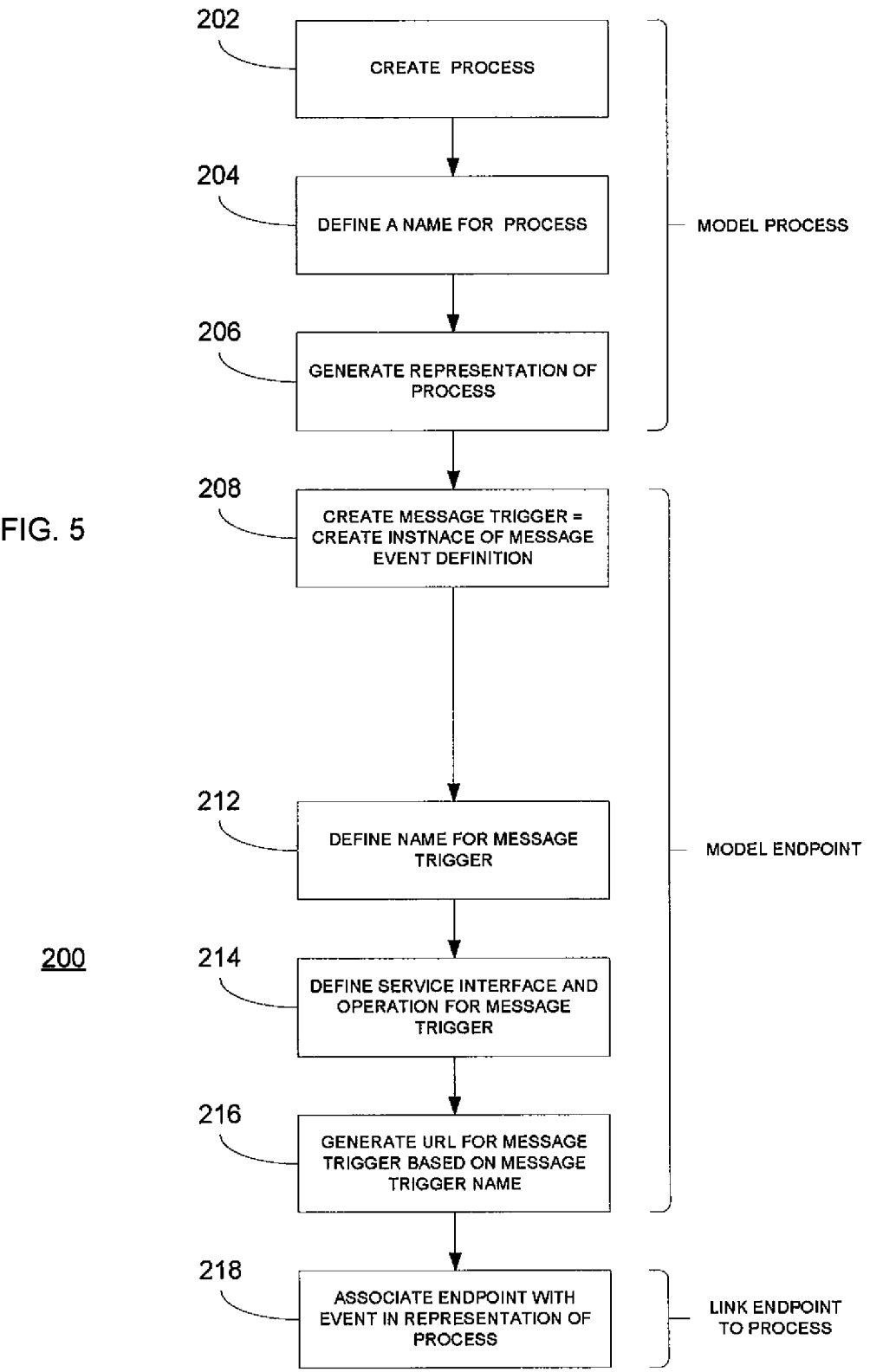
FIG. 5 is a flowchart of a method for providing a BPMN process as a service by using modeled endpoints.

FIG. 5 is a flowchart of a method 200 for providing a BPMN process as a service by using modeled endpoints. The method 200 includes the general steps of modeling a process, modeling an endpoint for the process, and then linking the endpoint to the process. The general steps will now be described in further detail. The general steps and detailed sub-processes can be performed by the BPMN tool 112, which can be implemented as a computer program product stored in a machine-readable memory and executed by one or more computer processors. The one or more computer processors are included with the client computer 102, but can also be provided by the server computer 104. The BPMN tool 112 can include a number of user interfaces (UIs) for interactive user communication, such as a graphical UI, a message event trigger editor UI, instruction menus, input screens, and the like.

At 202, a BPMN process is created. In some implementations, a folder in a folder tree of the BPMN tool 112 provides user-selectable controls for receiving an instruction to create the BPMN process. At 204, a name is created for the BPMN process. At 206, a representation of the process is generated. The representation can be a graphical visualization generated by the BPMN tool 112 and displayed in the graphical UI of the BPMN tool 112.

At 208, a Message Event Definition is created. The Message Event Definition is the "binder" between the service environment and the BPMN process definition environment, and designates a trigger of a catching event or a result of a throwing event of the BPMN process. For each message event trigger, at 212 an endpoint name is created, and at 214 a service interface and operation is defined. The input message of the associated operation is used to trigger the start event of the BPMN process. At 216 a Uniform Resource Locator (URL) is generated for the message event trigger based on the endpoint name created at 212. The URL can be influenced by the modeler (vendor, dename, eventdefinitionname, etc.), and is displayed in the message event trigger editor UI of the BPMN tool so that the endpoint information can easily be looked up.

At 218, the endpoint is associated with the start event in the representation of the process. Accordingly, from a service-oriented point of view, the Message Event Definition plays the role of an endpoint, while from a BPMN/process-oriented point of view it plays the role of an event trigger. Nevertheless, all service-oriented information is handled in the BPMN tool 112 under the umbrella of the BPMN construct event trigger.

Modeled service endpoints in BPMN tools seamlessly brings the service environment and BPMN environment together. The endpoint of a modeled process can be modeled in the BPMN tool directly without having to leave the BPMN domain, and without a service modeling tool. Further, there is no additional service knowledge required. The user can influence the endpoint URL by giving the message event trigger a meaningful name and thus can look it up easier on consumption. Furthermore, the Event Definition metamodel does not need any extension.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

The invention claimed is:

1. A computer-implemented method for modeling service endpoints of a process based on business process model and notation (BPMN), the method being performed by execution of computer readable program code by at least one processor of at least one computer system, the method comprising:
modeling the process using at least one of the processors running a BPMN modeling tool using BPMN graphic notation and flowcharting techniques of BPMN;
modeling a service endpoint using the BPMN modeling tool, wherein a user enters a name and selects a service operation for a model entity for the modeled service endpoint, the modeling of the service endpoint includes creating a message event definition reflective of the model entity, wherein an instance of the message event definition is created using a modeling infrastructure based on a BPMN metamodel and is stored as a transient model entity in at least one memory of the at least one computer system, wherein storage of the model entity includes
storing the modeled service endpoint as a trigger of a message start event of the modeled process;
attaching the message event definition to the message start event of the modeled process; and
binding an operation instance of the modeled process to a process instance of the modeled process using the message event definition;
generating, based on the entered name, using at least one of the processors, a uniform resource locator (URL) identifying the service endpoint, the URL being a web-based address under which the service operation as represented by the process can be called by a business process application; and
linking, using at least one of the processors, the service endpoint to the process.

2. The method in accordance with claim 1, wherein modeling the process further includes:
creating the process with the BPMN modeling tool;
creating a name for the process with the BPMN modeling tool; and
generating a graphical representation of the process for a user of the BPMN modeling tool.

3. The method in accordance with claim 1, wherein the message event definition is associated with an operation of a service interface.

4. The method in accordance with claim 3, wherein modeling the service endpoint further includes:
defining a trigger name for a trigger for the service endpoint; and
integrating the trigger name into the URL generated for the service endpoint.

5. The method in accordance with claim 4, wherein modeling the service endpoint further includes:
defining a service interface for the process and an operation of the process for the created message event.

6. The method in accordance with claim 1, further comprising provisioning the process as a web service.

7. The method in accordance with claim 6, further comprising executing the operation of the process through the service interface upon a call to the URL.

8. A system for modeling service endpoints of a business process model and notation (BPMN) process, the system comprising:
a storage device including an enterprise services repository;
a process composer computer including a BPMN modeling tool in communication with the storage device, the process composer being configured to:
model the process with the BPMN modeling tool on a client computer using BPMN graphic notation and flowcharting techniques of BPMN;
deploy the process to the process server;
model a service endpoint for the process using the BPMN modeling tool, wherein a user enters a name and selects a service operation for a model entity for the modeled service endpoint, the modeling of the service endpoint includes creating a message event definition reflective of the model entity, wherein an instance of the message event definition is created using a modeling infrastructure based on a BPMN metamodel and is stored as a transient model entity in the storage device, wherein storage of the model entity includes
storing the modeled service endpoint as a trigger of a message start event of the modeled process;
attaching the message event definition to the message start event of the modeled process; and
binding an operation instance of the modeled process to a process instance of the modeled process using the message event definition;
deploy the service endpoint to the process server;
generate, based on the entered name, a uniform resource locator (URL) identifying the service endpoint, the URL being a web-based address under which the service operation represented by the process can be called by a business process application; and
link the service endpoint to the process.

9. The system in accordance with claim 8, wherein to model the process, the process composer is further configured to:
create the process with the BPMN modeling tool;
create a name for the process with the BPMN modeling tool; and
generate a graphical representation of the process for a user of the BPMN modeling tool.

10. The system in accordance with claim 8, wherein the message event definition is associated with an operation of a service interface.

11. The system in accordance with claim 10, wherein to model the service endpoint the process composer is further configured to:
define a trigger name for a trigger for the service endpoint; and
integrate the trigger name into the URL defined for the service endpoint.

12. The system in accordance with claim 11, wherein to model the service endpoint the process composer is further configured to:
define a service interface for the process and an operation of the process for the created message event.

13. The system in accordance with claim 8, wherein the process server is further configured to provision the process and the service endpoint as a web service to execute the operation of the process through the service interface upon a call to the URL.

14. A computer program product for modeling service endpoints of a business process model and notation (BPMN) process, the product comprising a non-transitory storage medium readable by at least one processor and storing instructions for execution by the at least one processor for:
modeling the process in a BPMN domain using BPMN graphic notation and flowcharting techniques of BPMN;
modeling a service endpoint of the process in the BPMN domain, wherein a user enters a name and selects a service operation for a model entity for the modeled service endpoint, the modeling of the service endpoint includes creating a message event definition reflective of the model entity, wherein an instance of the message event definition is created using a modeling infrastructure based on a BPMN metamodel and is stored as a transient model entity in the at least one non-transitory storage medium, wherein storage of the model entity includes
storing the modeled service endpoint as a trigger of a message start event of the modeled process;
attaching the message event definition to the message start event of the modeled process; and
binding an operation instance of the modeled process to a process instance of the modeled process using the message event definition;
defining, based on the entered name, a uniform resource locator (URL) identifying the service endpoint, the URL being a web-based address under which the service operation represented by the process can be called by a business process application;
linking the service endpoint to the process via the URL; and
service-enabling the process and the service endpoint.

15. The computer program product in accordance with claim 14, wherein modeling the process further includes:
creating the process with the BPMN modeling tool;
creating a name for the process with the BPMN modeling tool; and
generating a graphical representation of the process for a user of the BPMN modeling tool.

16. The computer program product in accordance with claim 14, wherein modeling the service endpoint further includes:
creating the message event definition associated with an operation of a service interface of the process; and
creating an instance of a new message event as a trigger for the service endpoint.

17. The computer program product in accordance with claim 16, wherein modeling the service endpoint further includes:
creating an endpoint name for the new message event;
integrating the endpoint name into the URL defined for the service endpoint.

18. The computer program product in accordance with claim 17, wherein modeling the service endpoint further includes:
defining a service interface for the process and an operation of the process for the new message event.

19. The computer program product in accordance with claim 14, wherein the storage medium includes an enterprise services repository, and instructions for execution by the at least one processor further includes:
storing the process and the service endpoint in the enterprise services repository.

20. The computer program product in accordance with claim 19, wherein the URL calls the process and the service endpoint from the enterprise services repository.

* * * * *